United States Patent
Ohta et al.

(10) Patent No.: US 9,791,888 B2
(45) Date of Patent: Oct. 17, 2017

(54) POWER RECEPTION DEVICE AND POWER TRANSMISSION SYSTEM

(71) Applicant: PANASONIC CORPORATION, Osaka (JP)

(72) Inventors: Kazuyo Ohta, Chiba (JP); Hideyuki Kihara, Kanagawa (JP); Yohei Nagatake, Kanagawa (JP); Kyohei Kada, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1146 days.

(21) Appl. No.: 13/632,425

(22) Filed: Oct. 1, 2012

(65) Prior Publication Data

US 2013/0026849 A1  Jan. 31, 2013

Related U.S. Application Data

(63) Continuation of application No. PCT/JP2011/000787, filed on Feb. 14, 2011.

(30) Foreign Application Priority Data

Mar. 29, 2010 (JP) .................. 2010-074807

(51) Int. Cl.
*H02J 17/00* (2006.01)
*H02J 50/10* (2016.01)
(Continued)

(52) U.S. Cl.
CPC .................. *G06F 1/12* (2013.01); *G06F 1/26* (2013.01); *H02J 5/005* (2013.01); *H04B 5/0037* (2013.01); *H04B 5/0093* (2013.01)

(58) Field of Classification Search
CPC ........... G06F 1/12; G06F 1/26; H04B 5/0037; H04B 5/0093; H02J 5/005
(Continued)

(56) References Cited

U.S. PATENT DOCUMENTS 5,856,710 A  *  1/1999  Baughman ............ B60R 16/027
                                                        280/735
6,316,909 B1 *  11/2001  Honda ............... G01R 31/3648
                                                        320/108
(Continued)

FOREIGN PATENT DOCUMENTS

| JP | 11-017592 A | 1/1999 |
|----|-------------|--------|
| JP | 2008-206325 A | 9/2008 |
| WO | WO-2006/117866 A1 | 11/2006 |

OTHER PUBLICATIONS

International Search Report issued in International Patent Application No. PCT/JP2011/000787 dated May 17, 2011.
(Continued)

*Primary Examiner* — Jared Fureman
*Assistant Examiner* — Emmanuel R Dominique
(74) *Attorney, Agent, or Firm* — McDermott Will & Emery LLP

(57) ABSTRACT

A power reception device in a power transmission system including a power transmission device including a primary coil and the power reception device including a secondary coil, the power transmission device being configured to drive the primary coil and transmit AC power corresponding to a clock signal which is frequency-modulated according to a binary data signal, the primary coil and the secondary coil being electromagnetically coupled together to receive by the secondary coil in the power reception device, the AC power transmitted from the power transmission device, comprises a clock-signal extraction circuit configured to extract the clock signal from an induced voltage induced at one end of (Continued)

the secondary coil in receiving the AC power; and a demodulation circuit configured to generate a pulse synchronously with the clock signal extracted by the clock-signal extraction circuit, and demodulate the pulse to obtain the binary data signal.

12 Claims, 12 Drawing Sheets

(51) Int. Cl.
    *G06F 1/12*     (2006.01)
    *H02J 5/00*     (2016.01)
    *H04B 5/00*     (2006.01)
    *G06F 1/26*     (2006.01)

(58) Field of Classification Search
    USPC .......................................................... 307/104
    See application file for complete search history.

(56) References Cited

U.S. PATENT DOCUMENTS

| | | | | |
|---|---|---|---|---|
| 6,907,088 B1* | 6/2005 | Nakane | .............. | G06K 19/0723 329/347 |
| 7,804,197 B2* | 9/2010 | Iisaka | .................... | H02J 7/0011 307/104 |
| 8,026,694 B2* | 9/2011 | Kamijo | ................... | H02J 5/005 320/108 |
| 8,060,011 B2* | 11/2011 | Jin | ......................... | H02J 7/025 320/108 |
| 8,803,364 B2* | 8/2014 | Onishi | .................... | H02J 5/005 307/104 |
| 2002/0153997 A1* | 10/2002 | Nakane | .............. | G06K 19/0723 340/10.34 |
| 2003/0020987 A1* | 1/2003 | Kanesaka | ............ | H04B 10/299 398/154 |
| 2007/0188297 A1* | 8/2007 | Nakane | .............. | G06K 19/0701 340/5.6 |
| 2007/0228833 A1* | 10/2007 | Stevens | ................... | H02J 5/005 307/45 |
| 2008/0197713 A1* | 8/2008 | Jin | ......................... | H02J 7/025 307/104 |
| 2008/0280648 A1 | 11/2008 | Miyagawa et al. | | |
| 2009/0001818 A1* | 1/2009 | Iisaka | .................... | H02J 7/0011 307/104 |
| 2009/0252258 A1* | 10/2009 | Aoyagi | ................ | H04L 7/0338 375/329 |

OTHER PUBLICATIONS

Chinese Office Action issued in corresponding Chinese Application No. 201180017624.9, dated May 27, 2014, with English translation.

* cited by examiner

POWER RECEPTION DEVICE AND POWER
TRANSMISSION SYSTEM

CROSS REFERENCE TO RELATED
APPLICATIONS

This application is a Continuation of International Application No. PCT/JP2011/000787, filed on Feb. 14, 2011, which in turn claims the benefit of Japanese Application No. 2010-074807, filed on Mar. 29, 2010, the disclosures of which Applications are incorporated by reference herein.

BACKGROUND OF THE INVENTION

1. Field of the Invention

The present invention relates to a power reception device and a power transmission system.

2. Description of the Related Art

In recent years, a contactless power transmission method (also referred to as wireless power transmission method) which enables power transmission without a contact of a metal portion by utilizing electromagnetic induction has attracted lots of attention. Japanese Laid-Open Patent Application Publication No. 2008-206325 discloses a prior art of such a contactless power transmission method. This prior art discloses that a power transmission device converts clock signals at a power transmission side generated by frequency modulation using binary data signals corresponding to two levels, "0" and "1," respectively, into AC power (power transmission wave) and transmits the AC power (power transmission wave) to the power reception device. The power reception device includes a counter which operates in response to a clock signal at a power reception side having a higher frequency than the clock signal at the power transmission side. A time corresponding to cycles of the clock signal at the power transmission side is measured in such a manner that the counter counts the number of clock signals at the power reception side. Based on the measured number of the clock signals at the power reception side, frequencies of the clock signals at the power transmission side are detected.

FIG. 12 is a block diagram showing the conventional power reception device. Turning to FIG. 12, the power reception device includes a secondary coil L2, a power reception unit 42 including a rectification circuit 43, a load modulation unit 46, a power feeding control unit 48, and a power reception controller 50. The power reception device supplies electric power to a load 90 including a charging control unit 92 and a battery 94. An induced voltage at one end of the secondary coil (L2) is divided by a voltage division ratio between a resistor RB1 and a resistor RB2, and the divided voltage is input to a non-inverting input terminal of a comparator 71. The comparator 71 serves as a waveform shaping circuit. The comparator 71 outputs a clock signal (COMPI) at a power transmission side to a frequency binary data detection circuit 60. The frequency binary data detection circuit 60 includes a counter 73, a counter 77, a memory 79 and a f1/f2 determination circuit 81.

The frequency binary data detection circuit 60 measures a time corresponding to a n-cycle clock signal (COMPI) at a power transmission side by using an oscillation clock signal CLK (clock signal at the power reception side) of an oscillation circuit 58, and directly detects a frequency of the clock signal (COMPI). To be more specific, the counter 77 is activated in response to a first clock signal (COMPI) at the power transmission side, and starts counting using the clock signal CLK at the power reception side. When the counter 73 detects n cycles of the clock signal (COMPI) at the power transmission side, it outputs a detection signal CT to a reset terminal of the counter 77. The detection signal CT is fed to a memory 79 as a latch clock signal. In other words, the counter 77 is reset by the detection signal CT. A counted value of the counter 77 in reset is latched by the memory 79. In the above described manner, the cycles of the clock signal CLK at the power reception side, corresponding to n cycles of the clock signal (COMPI) at the power transmission side are measured, and the measured value is latched by the memory 79. The f1/f2 determination circuit 81 compares the measured value latched by the memory 79 to reference time information pre-obtained, to determine whether the frequency of the clock signal at the power transmission side is f1 or f2.

In the configuration of the above stated prior art, in the power reception device, since the number of clock signals at the power transmission side is counted, the clock signal at the power reception side generated by a clock signal source (oscillation circuit) which is different from the clock signal at the power transmission side is used. Therefore, it is difficult to establish synchronization between the power transmission device and the power reception device, and therefore it is difficult to cause a timing at the power transmission side and a timing at the power reception side to conform to each other in data communication between the power transmission side and the power reception side.

SUMMARY OF THE INVENTION

The present invention has been made under the circumstances, and an object of the present invention is to improve a data detection accuracy at a power reception side by providing synchronization between a power transmission side and the power reception side in a power transmission system in which AC power frequency-modulated based on data is transmitted from the power transmission side to the power reception side.

According to one aspect of the present invention, there is provided a power reception device in a power transmission system including a power transmission device including a primary coil and the power reception device including a secondary coil, the power transmission device being configured to drive the primary coil and transmit AC power corresponding to a clock signal which is frequency-modulated according to a binary data signal, the primary coil and the secondary coil being electromagnetically coupled together to receive by the secondary coil in the power reception device, the AC power transmitted from the power transmission device, the power reception device comprising: a clock-signal extraction circuit configured to extract the clock signal from an induced voltage induced at one end of the secondary coil in receiving the AC power; and a demodulation circuit configured to generate a pulse synchronously with the clock signal extracted by the clock-signal extraction circuit, and demodulate the pulse to obtain the binary data signal.

In accordance with this configuration, the binary data signal contained in the clock signal corresponding to the AC power (power transmission wave) transmitted by driving the primary coil is obtained by demodulation in the power reception side by processing a pulse synchronized with the clock signal extracted from the induced voltage induced at one end of the secondary coil. This can eliminate a need for an oscillation circuit for generating a clock signal different from the clock signal extracted from the induced voltage. In addition, since synchronization is provided between the power transmission side and the power reception side, a demodulation (detection) accuracy of the binary data signal at the power reception side can be improved.

In the power reception device, the demodulation circuit may include a pulse generating circuit configured to output a pulse having a constant pulse width corresponding to every edge of the clock signal extracted by the clock-signal extraction circuit; an integration circuit configured to integrate the pulse output from the pulse generating circuit; a binarization circuit configured to binarize a signal output from the integration circuit and output the binarized signal; and a binary data detection circuit configured to convert the binarized signal output from the binarization circuit into a binary data signal corresponding to binary data.

In accordance with this configuration, the content of the binary data signal transmitted from the power transmission side (primary side) can be detected properly based on the clock signal extracted by the clock-signal extraction circuit.

In the power reception device, when a frequency of the clock signal modulated in the power transmission device is a first frequency, a clock frequency in the power reception device may be the first frequency of the clock signal extracted by the clock-signal extraction circuit; and when the frequency of the clock signal modulated in the power transmission device is a second frequency, the clock frequency in the power reception device may be the second frequency of the clock signal extracted by the clock-signal extraction circuit.

In accordance with this configuration, since the clock frequency which is the reference of the operation of the overall power reception device is the first frequency or the second frequency of the clock signal extracted by the clock-signal extraction circuit, the power transmission side can be easily synchronized with the power reception side.

In the power reception device, each of the first frequency and the second frequency of the clock signal modulated in the power transmission device may be a frequency of a clock signal at a power transmission side in the power transmission device.

In accordance with this configuration, since the clock frequency which is the reference of the operation of the overall power transmission device is identical to the clock frequency which is the reference of the operation of the overall power reception device, the timing at the power transmission side can conform to the timing at the power reception side in the data communication performed between the power transmission side and the power reception side.

In the power reception device, the clock-signal extraction circuit may be a limiter circuit which is applied with the induced voltage as an input, sets an upper limit and a lower limit of the induced voltage and outputs the induced voltage having the upper limit and the lower limit.

In accordance with this configuration, the clock signal for use in demodulation can be directly extracted from the induced voltage induced at one end of the secondary coil.

In the power reception device, when the binary data signal used for modulating the clock signal is defined as "1," an AC voltage of n (n: integer of 2 or more) cycles of the first frequency may be induced by the secondary coil, when the binary data signal used for modulating the clock signal is defined as "0," an AC voltage of the n cycles of the second frequency may be induced by the secondary coil, the integration circuit may output a first voltage corresponding to the first frequency or a second voltage corresponding to the second frequency, and the binary data detection circuit may detect whether each of the first voltage and the second voltage output from the binary data detection circuit is either "0" or "1," based a result of counting a duration period of the first voltage or a duration period of the second voltage based on the clock signal extracted by the clock-signal extraction circuit.

In accordance with this configuration, the binary data signal can be detected more properly based on the clock signal extracted by the clock-signal extraction circuit.

In the power reception device, the binary data detection circuit may detect whether each of the first voltage and the second voltage output from the binary data detection circuit is either "0" or "1," when a counted value obtained when the duration period of the first voltage or the duration period of the second voltage is counted based on the clock signal extracted by the clock-signal extraction circuit exceeds m (m: integer of n or less and 2 or more).

In accordance with this configuration, the binary data signal can be detected more properly based on the clock signal extracted by the clock-signal extraction circuit.

According to another aspect of the present invention, there is provided a power transmission system including a power transmission device including a primary coil and a power reception device including a secondary coil, the power transmission device being configured to drive the primary coil and transmit AC power corresponding to a clock signal which is frequency-modulated by a binary data signal, the primary coil and the secondary coil being electromagnetically coupled together to receive by the secondary coil in the power reception device, the AC power transmitted from the power transmission device, the power reception device comprising: a clock-signal extraction circuit configured to extract the clock signal from an induced voltage induced at one end of the secondary coil in receiving the AC power; and a demodulation circuit configured to generate a pulse synchronously with the clock signal extracted by the clock-signal extraction circuit, and demodulate the pulse to obtain the binary data signal.

In accordance with this configuration, the binary data signal transmitted as the power transmission wave transmitted from the primary coil is obtained by demodulation in the power reception side based on the pulse synchronized with the clock signal extracted from the induced voltage induced at one end of the secondary coil. This can eliminate a need for an oscillation circuit for generating a clock signal different from the clock signal extracted from the induced voltage. Since synchronization is provided between the power transmission side and the power reception side in this way, a demodulation (detection) accuracy of the binary data signal at the power reception side can be improved.

In the power transmission system, the demodulation circuit may include: a pulse generating circuit configured to output a pulse having a constant pulse width corresponding to every edge of the clock signal extracted by the clock-signal extraction circuit; an integration circuit configured to integrate the pulse output from the pulse generating circuit; a binarization circuit configured to binarize a signal output from the integration circuit and output the binarized signal; and a binary data detection circuit configured to convert the binarized signal output from the binarization circuit into a binary data signal corresponding to binary data.

In accordance with this configuration, the content of the binary data signal transmitted from the primary side can be detected properly with a simple configuration based on the clock signal extracted by the clock-signal extraction circuit.

In the power transmission system, the demodulation circuit may include: a pulse generating circuit configured to output a pulse having a constant pulse width corresponding to every edge of the clock signal extracted by the clock-signal extraction circuit; an integration circuit configured to integrate the pulse output from the pulse generating circuit; a binarization circuit configured to binarize a signal output from the integration circuit and output the binarized signal; and a binary data detection circuit configured to detect a content of the binary data signal transmitted as a power transmission wave transmitted from the primary coil, based on the binarized signal output from the binarization circuit.

In the power transmission system, the power transmission device may further include a binary data signal output circuit configured to output a binary data signal defining "0" or "1," a modulation circuit configured to generate the clock signal which is an AC voltage having the first frequency or the second frequency based on the binary data signal which is output from the binary data signal output circuit; a power-transmission control circuit configured to generate a drive signal based on the clock signal output from the clock signal generating circuit; and a power transmission unit configured to drive the primary coil based on the drive signal output from the power-transmission control circuit and transmit AC power corresponding to the drive signal; the modulation circuit includes: a voltage generating circuit configured to generate a first voltage or a second voltage according to whether the binary data signal output from the binary data signal output circuit is "0" or "1"; and a voltage controlled oscillation circuit configured to generate the clock signal having the first frequency or the second frequency based on the first voltage or the second voltage generated in the voltage generating circuit.

In accordance with this configuration, the configuration of the power transmission side required to provide synchronization between the power transmission side and the power reception side can be implemented appropriately.

The above and further objects, features and advantages of the present invention will more fully be apparent from the following detailed description of preferred embodiments with accompanying drawings.

DETAILED DESCRIPTION OF THE PREFERRED EMBODIMENTS

Figure 1:
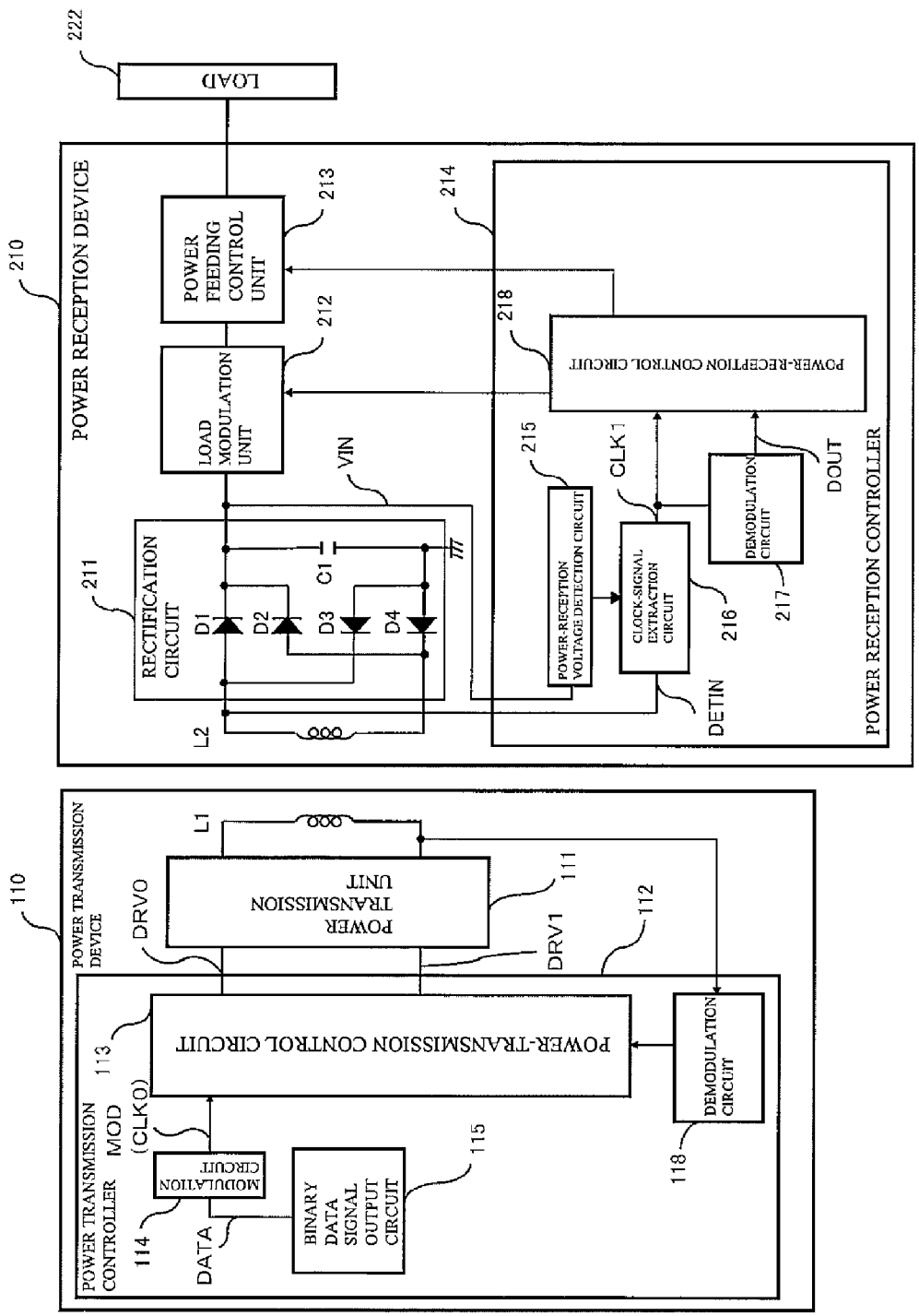
FIG. 1 is a block diagram showing the configuration of a power transmission system according to Embodiment 1 of the present invention.

Hereinafter, preferred embodiments of the present invention will be described with reference to the drawings. Throughout the drawings, the same or corresponding components are identified by the same reference numerals and will not be described in repetition.

Embodiment 1

[Schematic Configuration of Power Transmission System]

FIG. 1 is a block diagram showing the configuration of a power transmission system according to Embodiment 1 of the present invention.

Referring to FIG. 1, the power transmission system includes a power transmission device 110 including a primary coil L1 and a power reception device 210 including a secondary coil L2, and is configured such that the primary coil L1 and the secondary coil L2 are electromagnetically coupled together to construct a power transmission transformer. This enables electric power to be transmitted from the power transmission device 110 to the power reception device 210, and hence the electric power to be supplied to a load 222.

The power transmission device 110 is built into an apparatus at a power transmission side. The apparatus at the power transmission side is, for example, a charging apparatus. The power reception device 210 is built into electronic equipment at a power reception side. The electronic equipment at the power reception side is, for example, a cellular phone, an electric shaver, an electric brush, a wrist computer, a handy terminal, a watch, a codeless phone, a PDA (personal digital assistance), an electric vehicle, an IC card, etc. In a case where the electronic equipment at the power reception side is, for example, the cellular phone, the cellular phone is used as follows. When transmission of electric power is necessary, the cellular phone is placed in close proximity on a specified flat surface of the charging apparatus in a contactless (wireless) manner to allow a magnetic flux of the primary coil L1 to pass through the secondary coil L2. On the other hand, when transmission of electric power is unnecessary, the cellular phone is placed physically apart from the charging apparatus to prevent the magnetic flux of the primary coil L1 from passing through the secondary coil L2.

In the power transmission system of FIG. 1, inter-host communication between a host at the power transmission side and a host at the power reception side is enabled.

The data communication from the power transmission side to the power reception side is implemented by transmitting a power transmission wave frequency-modulated (or frequency-phase-modulated) according to data which is a content of a data signal. Frequency modulation means frequency shift keying (FSK) which is one type of digital modulation. The frequency shift keying is a method in which binary data which is contents of binary data signals are assigned to frequencies in such a manner that a carrier wave corresponding to data "0" is a low frequency and a carrier wave corresponding to "1" is a high frequency. The frequency shift keying corresponds to frequency modulation in analog. Typically, the modulation means a modulation method in which data is superposed on a carrier wave when the data is transmitted. Hereinafter, it is assumed that the modulation is broadly defined as conversion into an optimal electric signal in transmission of data. Specifically, in the case of transmitting the data "1" to the power reception device 210, the power transmission unit 111 generates a modulation signal MOD which is an AC voltage having a frequency f1 and n cycles, while in the case of transmitting the data "0" to the power reception device 210, the power transmission unit 111 generates a modulation signal MOD which is an AC voltage having a frequency f2 and n cycles. In this way, the AC power including the data is transmitted from the power transmission side to the power reception side. As a result, a power reception controller 214 included in the power reception device 210 detects and demodulates a change in the frequency of the power transmission wave, thereby detecting the data "1" or the data "0" transmitted from the power transmission side.

By comparison, data communication from the power reception side to the power transmission side is implemented by load modulation. Specifically, a load modulation unit 212 at the power reception side changes a load state at the power reception side according to the content of data to be transmitted to the power transmission side, thereby changing a waveform of a voltage (power transmission wave) induced by the primary coil L1. For example, in the case of transmitting the data "1" from the power reception side to the power transmission side, the power reception side is placed in a high-load state, while in the case of transmitting the data "0" from the power reception side to the power transmission side, the power reception side is placed in a low-load state. Thus, a demodulation circuit 118 at the power transmission side detects and demodulates the change in the load state at the power reception side based on the voltage induced by the primary coil L1 by the load modulation at the power reception side, thereby detecting the data "1" or the data "0" transmitted from the power reception side.

[Overall Configuration of Power Transmission Side in Power Transmission System]

Hereinafter, the configuration of the power transmission side in the power transmission system of FIG. 1 will be described.

The power transmission device (also referred to as primary module) 110 includes a power transmission controller 112, the power transmission unit 111, and the primary coil L1. The power transmission controller 112 is configured to control the components of the power transmission device 110, and includes, an integrated circuit, a microcomputer, programs of the microcomputer, etc. The power transmission controller 112 includes a binary data signal output circuit 115, a modulation circuit 114, a control circuit 113 at a power transmission side (power-transmission control circuit) 113, and the demodulation circuit 118.

The binary data signal output circuit 115 outputs data transmitted from the power transmission device 110 to the power reception device 210 as digital data DATA of "0" or "1." For example, when 8-bit data is necessary as information to be transmitted to the power reception device 210, the binary data signal output circuit 115 outputs the 8-bit digital data DATA, for example, "00101000."

Figure 2:
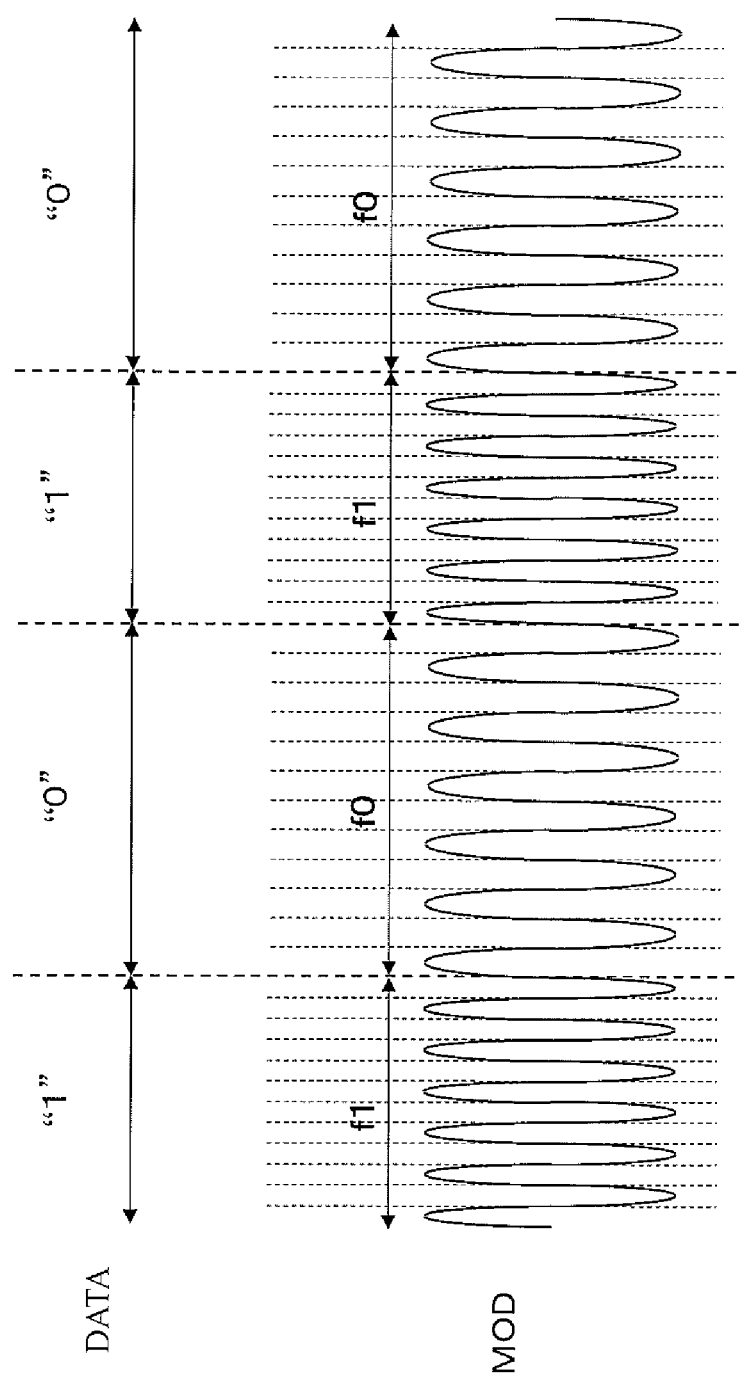
FIG. 2 is a view showing an exemplary waveform of a modulation signal in the power transmission system of FIG. 1.

The modulation circuit 114 performs frequency modulation based on each of the bits constituting the digital data DATA output from the binary data signal output circuit 115, and outputs a modulation signal MOD having two frequencies which are a frequency f0 or a frequency f1. In the present embodiment, it is supposed that the frequency f0 is 120 kHz and the frequency f1 is 130 kHz. And, when 1 bit to be modulated, is "0," among the bits constituting the digital data DATA, the modulation circuit 114 outputs a modulation signal MOD having the frequency of f0, while when 1 bit to be modulated, is "0," among the bits constituting the digital data DATA, the modulation circuit 114 outputs a modulation signal MOD having the frequency of f1. FIG. 2 is a view showing an exemplary waveform of the modulation signal in the power transmission system of FIG. 1.

The frequency f0 and the frequency f1 are used as clock signals within the power transmission controller 112. Therefore, the processing within the power transmission controller 112 is performed based on the frequency f0 and the frequency f1. Since the frequency f0 and the frequency f1 are used as the clock signals of the power transmission device 110 as described above, there is no need for an oscillation circuit for generating the clock signals, in the power transmission device 110.

The power-transmission control circuit 113 performs a process for converting the modulation signal MOD having the frequency f0 and the modulation signal MOD having the frequency f1 which are input from the modulation circuit 114 into drive signals DRV0, DRV1, respectively, used for driving the power transmission unit 111, a process for detecting data derived by demodulating the load modulation signal from the power reception device 210, by the demodulation circuit 118 connected to one end of the primary coil L1, and a process for setting a logic value ("0," "1") of each of the bits constituting the digital data DATA output from the binary data signal output circuit 115. When the modulation signal MOD having the frequency f0 is input from the modulation circuit 114, the frequency of the clock signal in the power-transmission control circuit 113 is f0, while when the modulation signal MOD having the frequency f1 is input from the modulation circuit 114, the frequency of the clock signal in the power-transmission control circuit 113 is f1.

Figure 3:
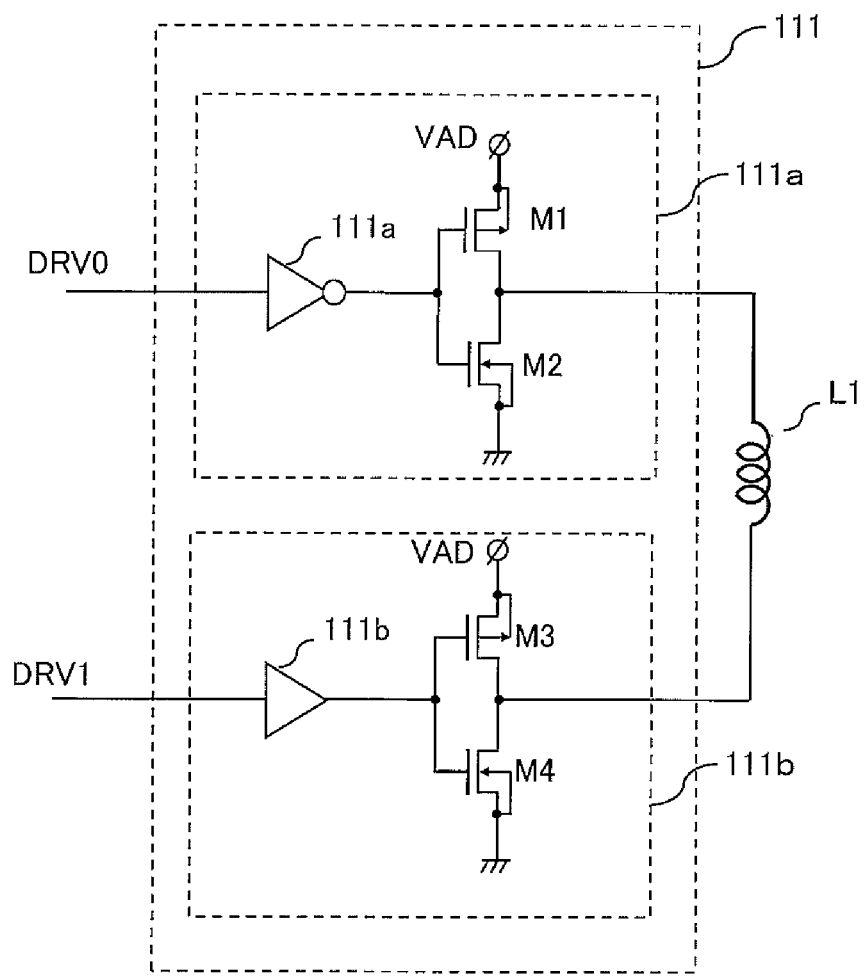
FIG. 3 is a circuit diagram showing the configuration of a power transmission unit in the power transmission system of FIG. 1.

The power transmission unit 111 is configured as a driver circuit for driving the primary coil L1 based on the drive signals DRV0, DRV1 output from the power-transmission control circuit 113. FIG. 3 is a circuit diagram showing the configuration of the power transmission unit 111. FIG. 3 is a circuit diagram showing the configuration of the power transmission unit 111 in the power transmission system of FIG. 1. Turning to FIG. 3, the power transmission unit 111 includes, for example, a power transmission driver 111a for driving one end of the primary coil L1 and a power transmission driver 111b for driving the other end of the primary coil L1. The power transmission drivers 111a, 111b included in the power transmission unit 111 are implemented by inverter circuits constituted by, for example, power-MOS transistors, respectively.

The primary coil (also referred to as power transmission coil) L1 is electromagnetically coupled to the secondary coil (also referred to as power reception coil) L2 to construct a power transmission transformer.

The demodulation circuit 118 detects a change in the voltage waveform induced by the primary coil L1 based on the load modulation at the power reception side, thereby detecting the load state (load fluctuation, high load state or low load state) at the power reception side. For example, a change of a load current as the load state at the power reception side causes a change of a voltage waveform induced by the primary coil L1. The demodulation circuit 118 detects (demodulates) this change in the waveform, and outputs a result of the detection to the power-transmission control circuit 113. Thereby, the power-transmission control circuit 113 is able to detect the load state at the power reception side based on the result of detection performed by the demodulation circuit 118, and to detect the data transmitted from the power reception side.

[Configuration of Modulation Circuit]

Figure 4:
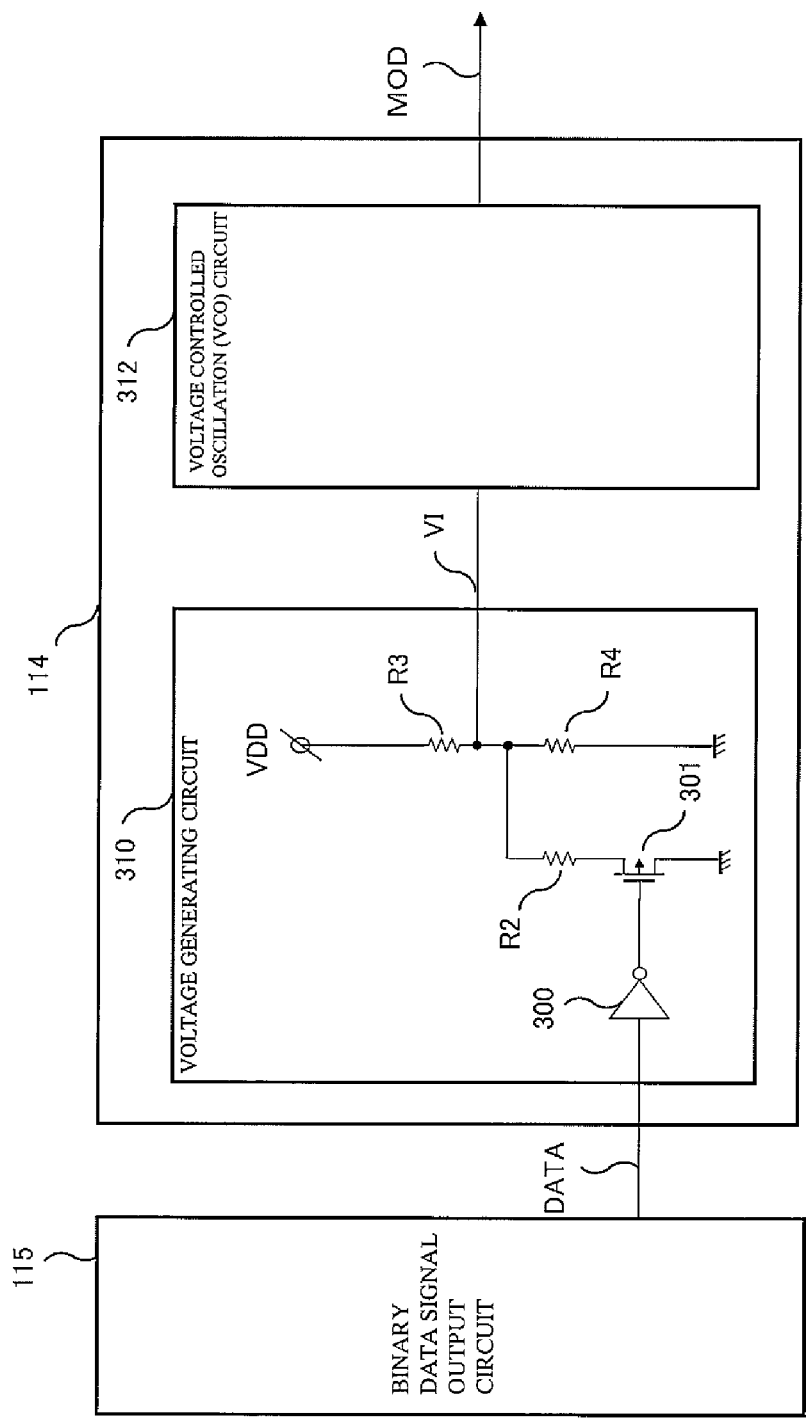
FIG. 4 is a circuit diagram showing the configuration of a modulation circuit in the power transmission system of FIG. 1.

FIG. 4 is a circuit diagram showing the configuration of the modulation circuit 114 in the power transmission system of FIG. 1. Turning now to FIG. 4, the modulation circuit 114 includes a voltage generating circuit 310 and a voltage controlled oscillation (VCO) circuit 312.

The voltage generating circuit 310 generates and outputs an input voltage VI corresponding to the digital data DATA output from the binary data signal output circuit 115 and input to the voltage controlled oscillation (VCO) circuit 312. The voltage generating circuit 310 includes an inverter 300, a Nch MOS transistor 301, and resistors R2, R3, R4. The MOS transistor 301 is turned ON or OFF based on the digital data DATA derived by inverting the logic by the inverter 300.

Figure 5:
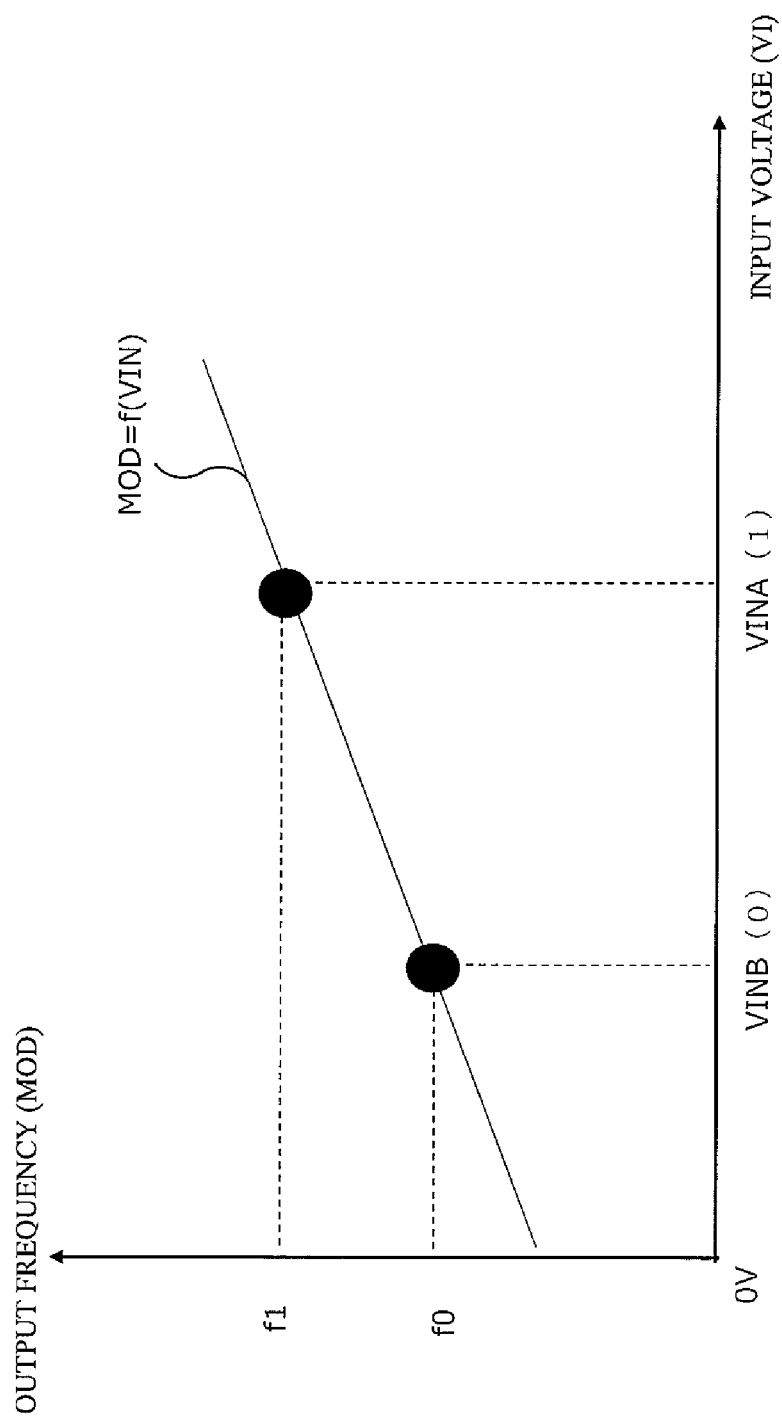
FIG. 5 is a graph showing a frequency characteristic of a modulation signal with respect to an input voltage in a voltage controlled oscillation circuit of FIG. 4.

The voltage controlled oscillation circuit 312 outputs the modulation signal MOD having the frequency f0 or the modulation signal MOD having the frequency f1, based on the input voltage VI output from the voltage generating circuit 310 and input to the voltage controlled oscillation circuit 312. FIG. 5 is a graph showing an output frequency f (VIN) characteristic of the modulation signal MOD of the voltage controlled oscillation circuit 312 of FIG. 4, with respect to the input voltage VI. As can be seen from this graph, when the input voltage is VINB, the frequency f0 is output from the voltage controlled oscillation circuit 312, while when the input voltage is VINA, the frequency f1 is output from the voltage controlled oscillation circuit 312.

A resistance ratio among the resistors R2, R3, and R4 of the voltage generating circuit 310 may be set so that when the digital data DATA output from the binary data signal output circuit 115 is "1," the input voltage VI input to the voltage controlled oscillation circuit 312 is VINA, while when the digital data DATA output from the binary data signal output circuit 115 is "0," the input voltage VI input to the voltage controlled oscillation circuit 312 is VINB. The resistance ratio among the resistors R2, R3, and R4 is specifically as follows.

When DATA is "1," the MOS transistor 301 is OFF, and the input voltage VI (=VINA) input to the voltage controlled oscillation circuit 312 is expressed as the following formula:

$$VINA = VDD/(1+(R3/R4)) \quad (1)$$

When DATA is "0," the MOS transistor 301 is ON, and the input voltage VI (=VINB) input to the voltage controlled oscillation circuit 312 is expressed as the following formula if an ON-resistance value of the MOS transistor 301 is ignored:

$$VINB = VDD/(1+(R3 \cdot ((1/R2)+(1/R4)))) \quad (2)$$

Based on the formula (1) and the formula (2), the resistance ratio among the resistor R2, the resistor R3, and the resistor R4 is expressed as the formula (3):

$$R2:R3:R4 = (1-(VINA/VDD)) \cdot (VINB/(VINA-VINB)):\\((VDD/VINA)-1):1 \quad (3)$$

A circuit configuration of the voltage generating circuit 310 is not limited to the above but may be various.

[Overall Configuration of Power Reception Side in Power Transmission System]

Hereinafter, the configuration of the power reception side in the power transmission system of FIG. 1 will be described.

The power reception device (also referred to as secondary module) 210 includes the secondary coil L2, a rectification circuit 211, a load modulation unit 212, a power feeding control unit 213 and a power reception controller 214.

The rectification circuit 211 is a diode bridge full-wave rectification circuit including four diodes D1 to D4 and a capacitor C1. The rectification circuit 211 converts the AC voltage induced by the secondary coil L2 into the DC voltage VIN.

The load modulation unit 212 performs a load modulation process based on a H/L control signal of the power-reception control circuit 218. To be specific, in the case of transmitting data from the power reception side to the power transmission side, the load modulation unit 212 changes the load state based on that data to change the load state at the power reception side, thereby changing the waveform of the induced voltage of the primary coil L1. In other words, the load modulation unit 212 changes the load state at the power reception side based on the data to be transmitted, thereby performing amplitude modulation of the induced voltage of the primary coil L1.

The power feeding control unit 213 controls activation/deactivation of power feeding to the load 22 based on the DC voltage VIN of the rectification circuit 211. Specifically, the power feeding control unit 213 controls the electric power to be fed to the load 222 based on the DC voltage generated by conversion in the rectification circuit 211.

The power reception controller 214 includes a power-reception voltage detection circuit 215, a clock-signal extraction circuit 216, a demodulation circuit 217, and a control circuit 218 at the power reception side (power-reception control circuit 218).

The power-reception voltage detection circuit 215 compares the DC voltage VIN output from the rectification circuit 211 to a predetermined threshold voltage VREF. When the DC voltage VIN is higher than the threshold voltage VREF, the power-reception voltage detection circuit 215 determines that the power reception device 210 is receiving the electric power from the power transmission device 110. Thus, the power-reception voltage detection circuit 215 detects that the power reception device 210 is receiving the electric power from the power transmission device 110.

The secondary coil L2 receives the AC power (power transmission wave) based on the modulation signal MOD transmitted from the primary coil L1. The clock-signal extraction circuit 216 extracts a clock signal CLK1 at the power reception side used in the operation of the components within the power reception device 210 based on a change in an electric potential of an induced voltage DETIN induced at one end of the secondary coil L2. Therefore, the frequency of the clock signal CLK1 at the power reception side within the power reception device 210 is the frequency f0 or the frequency f1, like the frequency of the modulation signal MOD at the power transmission side. Because of this, in the power reception device 210, there is no need for an oscillation circuit for generating the clock signals for use in the operation at the power reception side. And, when the frequency of the modulation signal MOD is f0, the frequency of the clock signal in the power transmission device 110 and the frequency of the clock signal in the power reception device 210 are both f0. Also, when the frequency of the modulation signal MOD is f1, the frequency of the clock signal in the power transmission device 110 and the frequency of the clock signal in the power reception device 210 are both f1.

The demodulation circuit 217 obtains "0" as demodulated data DOUT when the frequency of the clock signal CLK1 at the power reception side which is extracted by the clock-signal extraction circuit 216 is f0, and obtains "1" as the demodulated data DOUT when the frequency of the clock signal CLK1 at the power reception side which is extracted by the clock-signal extraction circuit 216 is f1.

The power-reception control circuit 218 is configured to perform control processes for the components within the power reception device 210, and includes, an integrated circuit (IC), a microcomputer operative according to programs, etc. The power reception controller 214 controls the load modulation unit 212 and the power feeding control unit 213 based on the demodulated data DOUT output from the demodulation circuit 217 and the clock signal CLK1 at the power reception side which is extracted by the clock-signal extraction circuit 216. Specifically, the power reception controller 214 performs sequence control processes and detection processes required for installation detection, frequency detection, load modulation, fully charged state detection, etc.

[Configuration and Operation of Power-Reception Voltage Detection Circuit]

Figure 6:
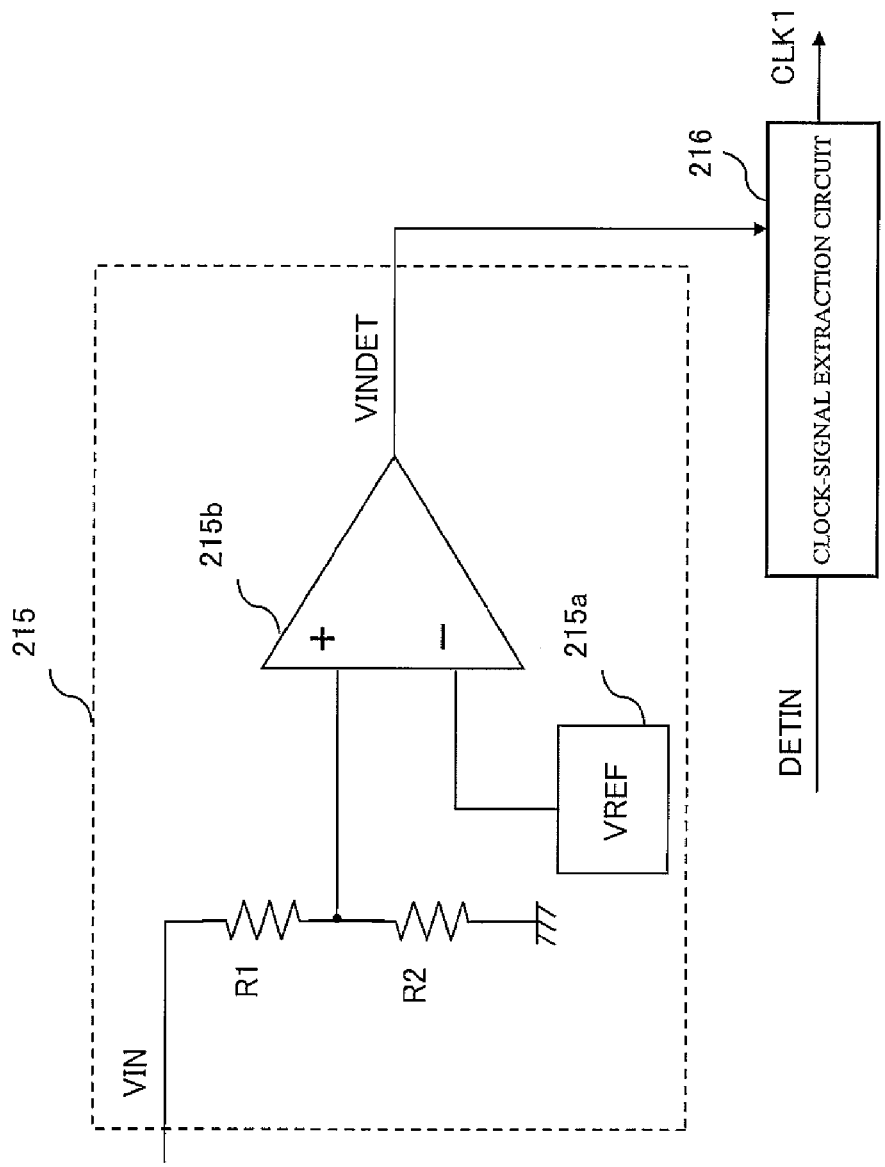
FIG. 6 is a circuit diagram showing the configuration of a power-reception voltage detection circuit in the power transmission system of FIG. 1.

FIG. 6 is a circuit diagram showing the configuration of the power-reception voltage detection circuit 215 in the power transmission system of FIG. 1. Referring to FIG. 6, the power-reception voltage detection circuit 215 includes a resistance voltage divider including a resistor R1 and a resistor R2, a reference-voltage generating unit 215a, and a differential amplifier 215b. A voltage (=VIN·R2/(R1+R2)) derived by dividing the DC voltage VIN by a voltage division ratio between the resistor R1 and the resistor R2, is applied to a non-inverting input terminal of the differential amplifier 215b. A reference voltage VREF generated by the reference-voltage generating unit 215a is applied to an inverting input terminal of the differential amplifier 215b. When the voltage derived by the resistance voltage divider is higher than the reference voltage VREF, the differential amplifier 215b outputs a detection signal VINDET "High" through its output terminal.

Figure 7:
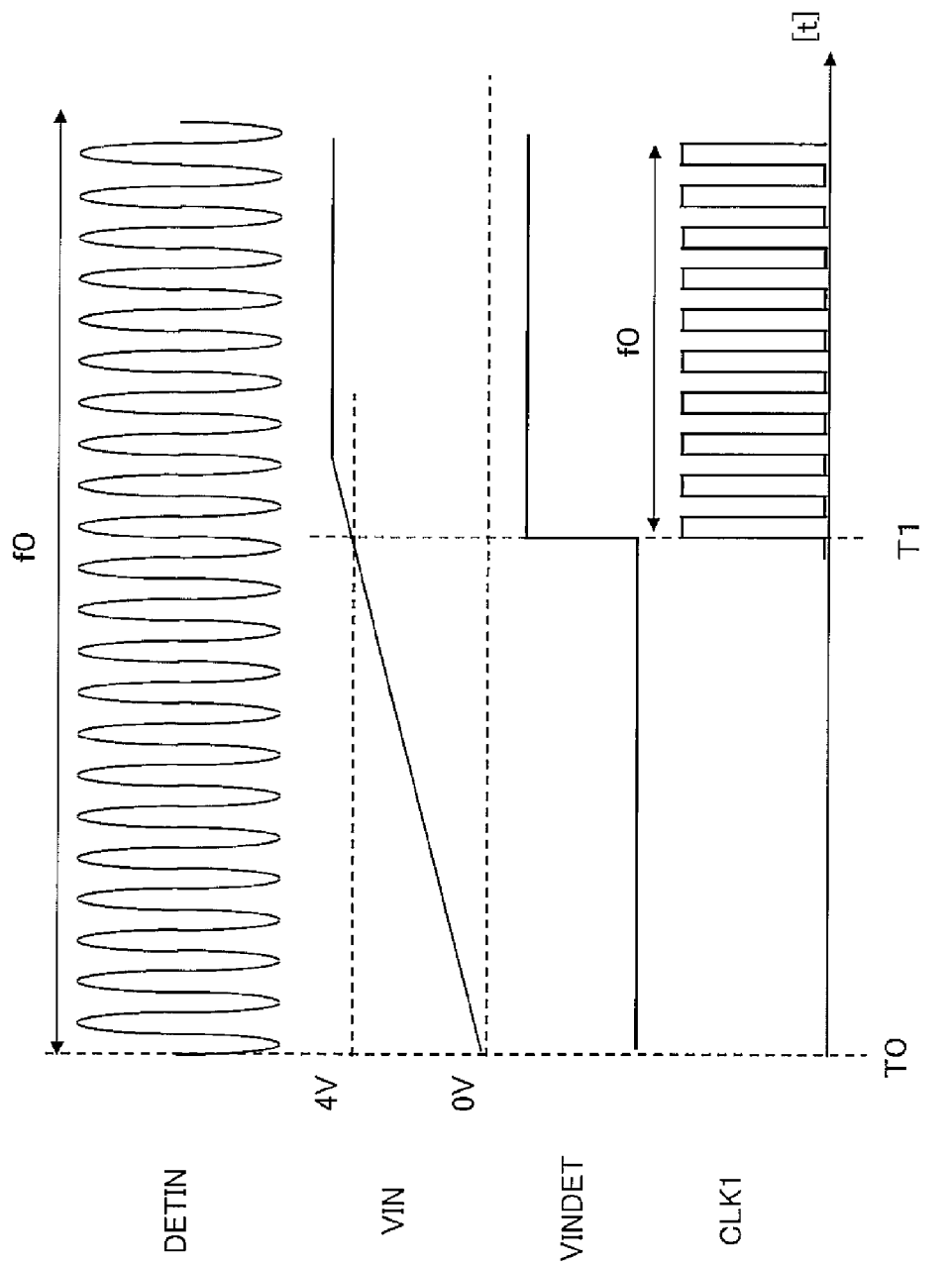
FIG. 7 is a waveform diagram showing the operation of the power-reception voltage detection circuit in the power transmission system of FIG. 1.

FIG. 7 is a waveform diagram showing the operation of the power-reception voltage detection circuit 215 in the power transmission system of FIG. 1. Referring to FIG. 7, there is shown a waveform in a case where continuous power transmission from the primary coil L1 based on the modulation signal MOD having the frequency f0, starts at a time T0. As can be seen from the waveform, the frequency of the induced voltage DETIN at one end of the secondary coil L2 is identical to the frequency f0 of the modulation signal MOD transmitted from the primary coil L1. For example, when the reference voltage VREF generated in the reference-voltage generating unit 215a is set so that VINDET switches when the DC voltage VIN is 4V, the DC voltage VIN output from the rectification circuit 211 starts to rise at the time T0, reaches 4V set as the reference voltage VREF at a time T1, and then is stabilized at a constant voltage. At the time point at which the DC voltage VIN reaches 4V, the detection signal VINDET switches from Low to High, and the clock-signal extraction circuit 216 extracts the clock signal CLK1 having the frequency f0 at the power reception side.

[Configuration and Operation of Clock-Signal Extraction Circuit and Demodulation Circuit]

Figure 8:
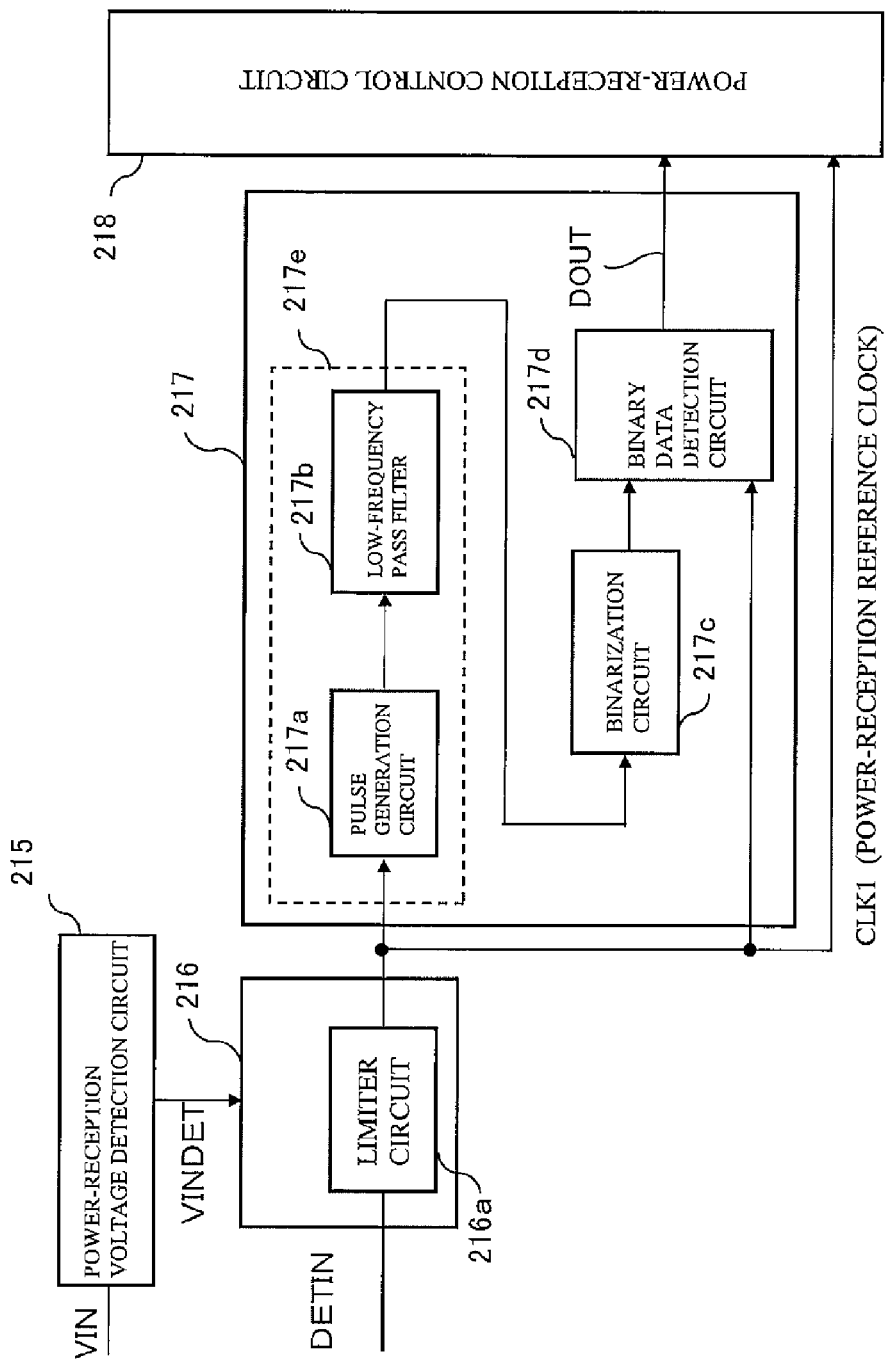
FIG. 8 is a block diagram showing the configuration of a clock-signal extraction circuit and a demodulation circuit in the power transmission system of FIG. 1.

FIG. 8 is a block diagram showing the configuration of the clock-signal extraction circuit 216 and the demodulation circuit 217 in the power transmission system of FIG. 1.

The clock-signal extraction circuit 216 includes a limiter circuit 216a which sets an upper limit and a lower limit to the induced voltage DETIN at one end of the secondary coil L2. The limiter circuit 216a extracts the clock signal CLK1 at the power reception side for use within the power reception device 210.

A pulse count detection circuit 217e includes a pulse generating circuit 217a and a low-frequency pass filter 217b and converts the clock signal CLK1 at the power reception side which is extracted by the clock-signal extraction circuit 216 into a voltage. The pulse generating circuit 217a is applied as an input with the clock signal CLK1 at the power reception side which is output from the clock-signal extraction circuit 216, and a monostable multi vibrator circuit or the like outputs a pulse having a constant pulse width corresponding to every edge timing of the clock signal CLK1 at the power reception side regardless of a change in the frequency of the clock signal CLK1 at the power reception side. A low-frequency pass filter 217b integrates a pulse output from the pulse generating circuit 217a and converts it into a DC voltage. Therefore, according to the change in the frequency of the extracted clock signal CLK1 at the power reception side, the output voltage of the pulse count detection circuit 217e changes. When the output voltage of the pulse count detection circuit 217e in the case where the frequency f0 is 120 kHz is VP0 and the output voltage of the pulse count detection circuit 217e in the case where the frequency f1 is 130 kHz is VP1, a relationship of "VP0<VP1" is established.

A binarization circuit 217c outputs a square wave having a voltage "Low" when the voltage output from the pulse count detection circuit 217e is the output voltage VP0 and outputs a square wave having a voltage "High" when the voltage output from the pulse count detection circuit 217e is the output voltage VP1.

A binary data detection circuit 217d detects that the demodulated data DOUT is "1," when a period of "High" of the binarization circuit 217c is "n" cycles of the clock signal CLK1 at the power reception side which is extracted by the clock-signal extraction circuit 216, and the value of "n" is equal to or greater than a detected counted number "m" ("m" is an integer equal to or less than "n"). For example, when "m"=50, and "n" is equal to or greater than 50, the binary data detection circuit 217d detects "High." "Low" is detected in the same manner.

Figure 9:
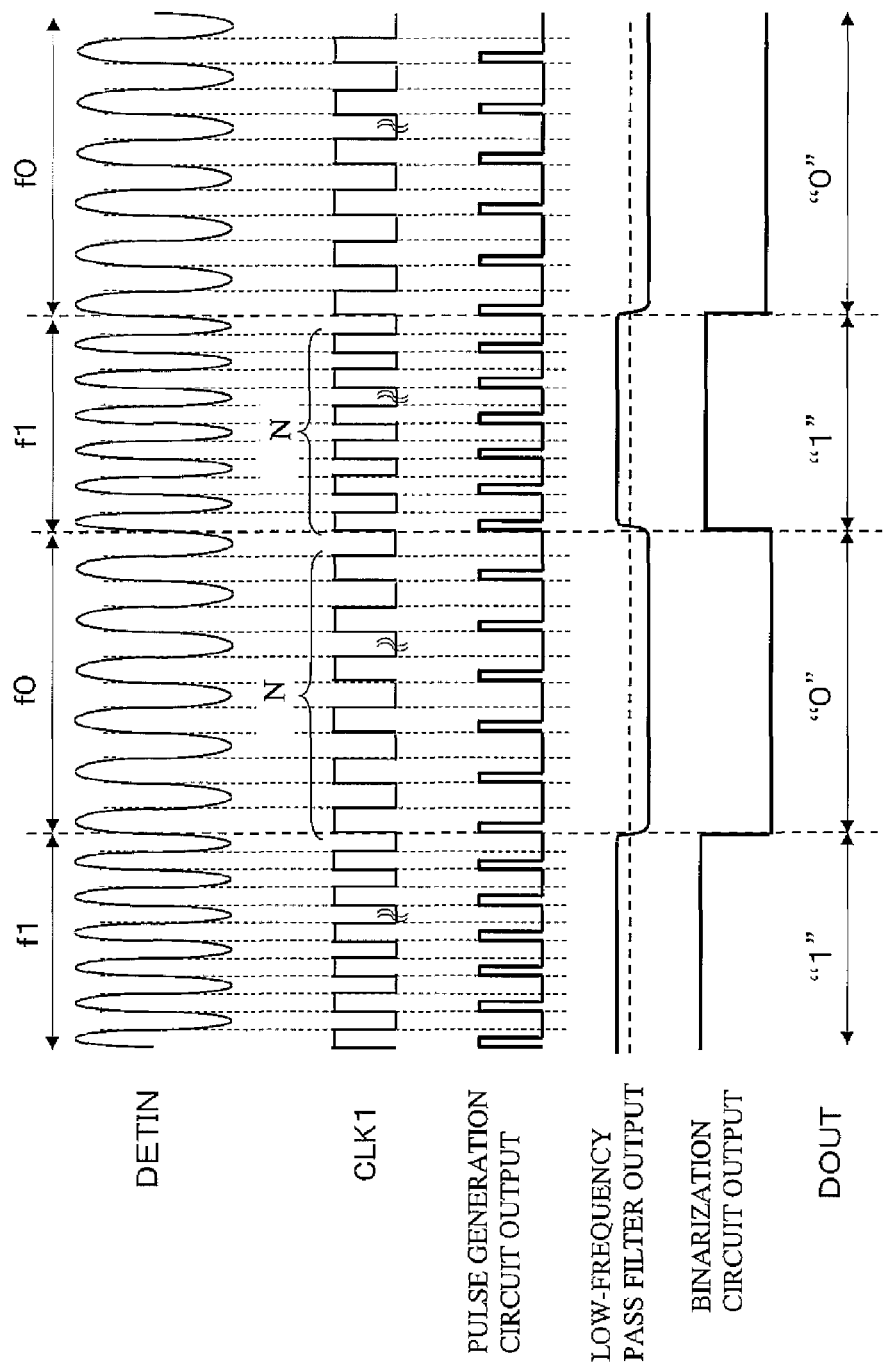
FIG. 9 is a waveform diagram showing the operation of the clock-signal extraction circuit and the operation of the demodulation circuit in the power transmission system of FIG. 1.

FIG. 9 is a waveform diagram showing the operation of the clock-signal extraction circuit 216 and the operation of the demodulation circuit 217 in the power transmission system of FIG. 9. Referring to FIG. 9, the induced voltage DETIN having the frequency f0, f1, representing the binary data, is input to the clock-signal extraction circuit 216. In the clock-signal extraction circuit 216, the limiter circuit 216a converts the induced voltage DETIN into the clock signal CLK1 at the power reception side. The clock signal CLK1 at the power reception side is used as the clock signal at the power reception side, for example, an operation clock signal of the power-reception control circuit 218. The pulse generating circuit 217a generates a pulse synchronously with edge timings of the clock signal CLK1 at the power reception side which is extracted by the clock-signal extraction circuit 216. The low-frequency pass filter 217b integrates the pulse, outputs the output voltage VP0 corresponding to the frequency f0, and the output voltage VP1 corresponding to the frequency f1. The binarization circuit 217*c* converts two outputs of the low-frequency pass filter 217*b* into a square wave having a voltage of High or Low such that their magnitude relationship is defined. The binary data detection circuit 217*d* demodulates the square wave output from the binarization circuit 217*c* to the binary data detection circuit 217*d*, to obtain the digital data DATA in modulation.

Figure 10:
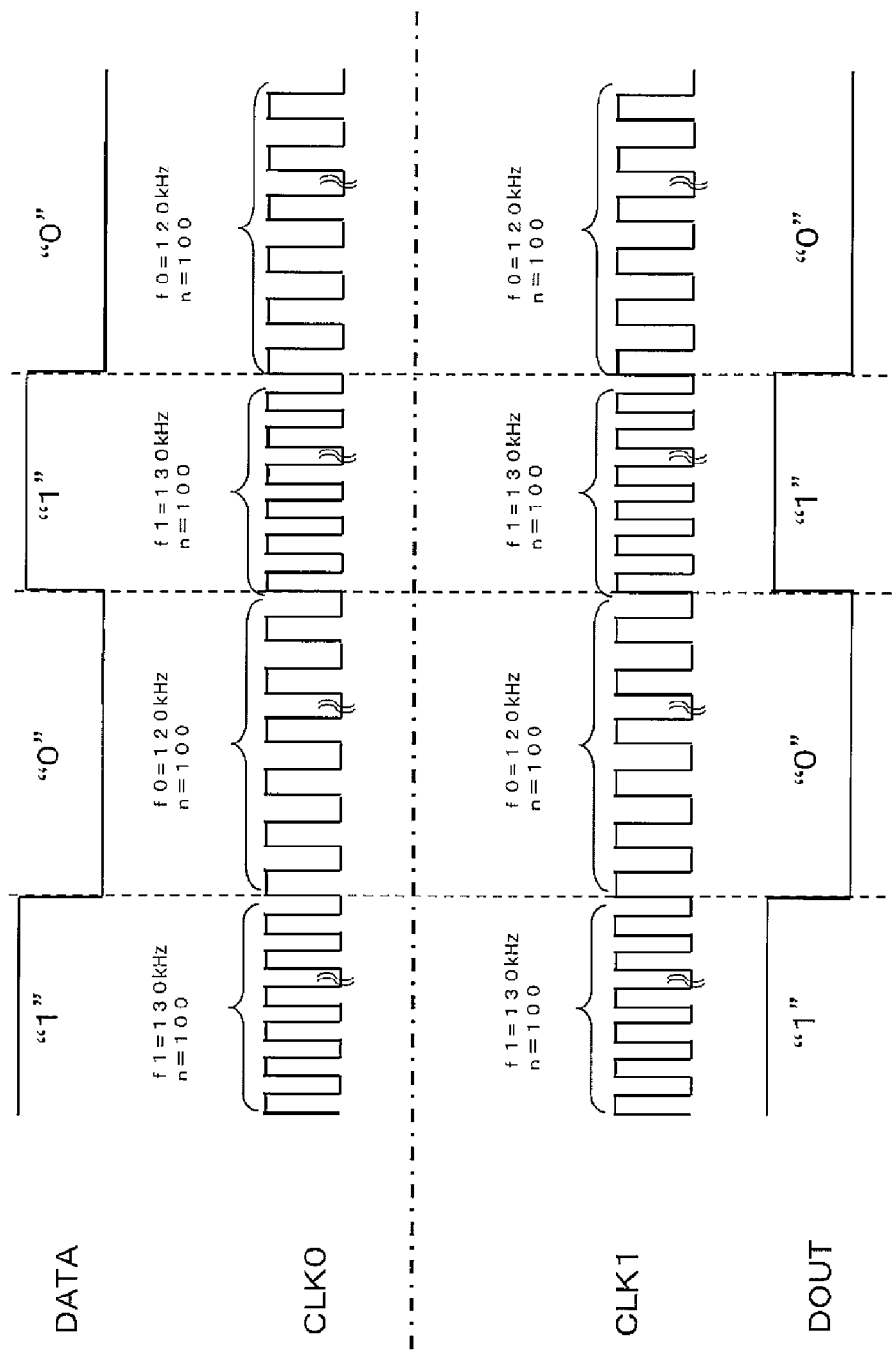
FIG. 10 is a view showing the relationship between a frequency of a clock signal at a power transmission side and a frequency of a clock signal at a power reception side in the power transmission system of FIG. 1.

FIG. 10 is a view showing the relationship between the frequency of the clock signal at the power transmission side and the frequency of the clock signal at the power reception side in the power transmission system of FIG. 1. As can be seen from FIG. 10, when the frequency of the modulation signal MOD output from the modulation circuit 114 at the power transmission side is f0, the frequency of the clock signal at the power transmission side is also f0, and the frequency of the clock signal CLK1 at the power reception side which is extracted by the clock-signal extraction circuit 216 at the power reception side is also f0. Likewise, when the frequency of the modulation signal MOD output from the modulation circuit 114 at the power transmission side is f1, the frequency of the clock signal at the power transmission side is also f1, and the frequency of the clock signal CLK1 at the power reception side which is extracted by the clock-signal extraction circuit 216 at the power reception side is also f1.

Embodiment 2

Figure 11:
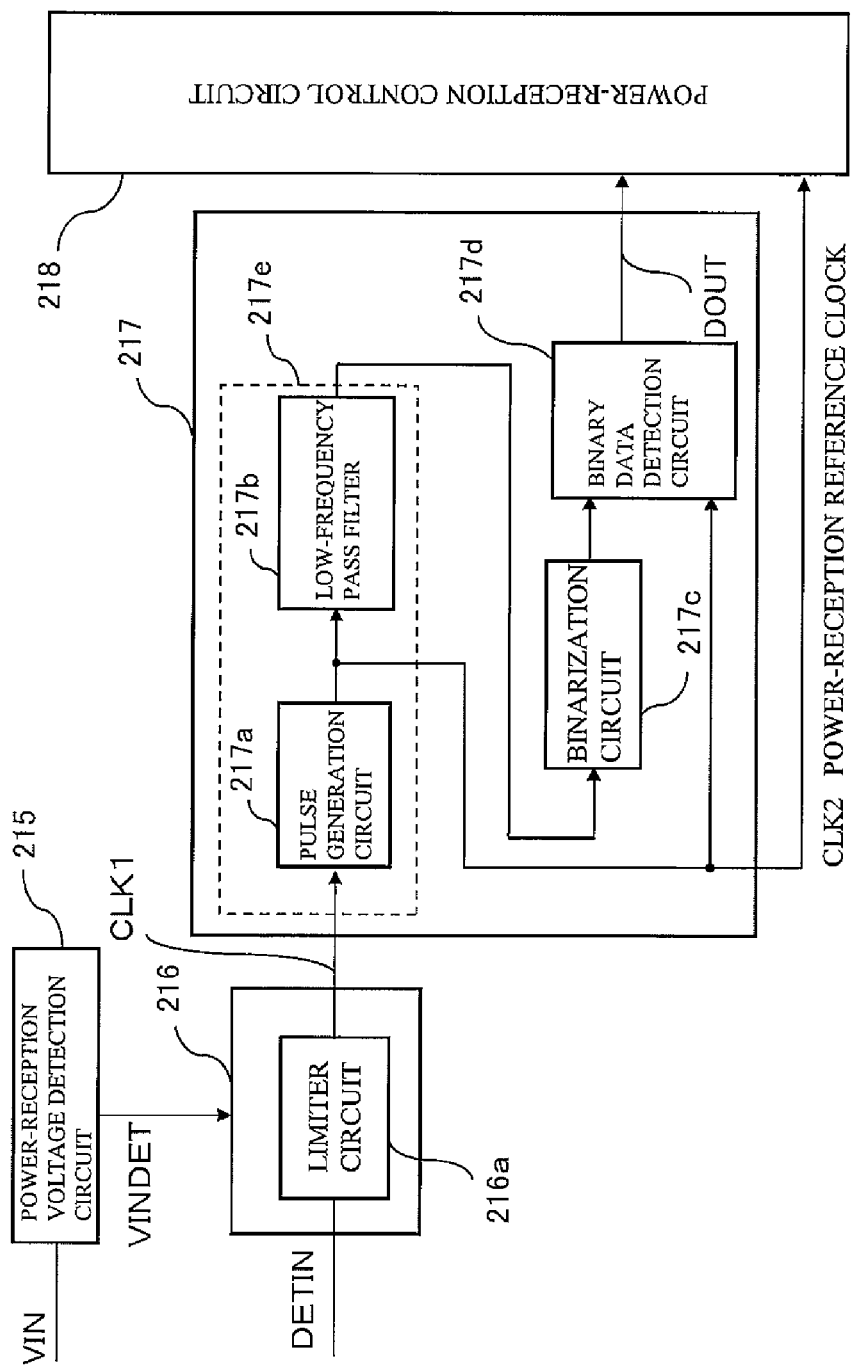
FIG. 11 is a block diagram showing the configuration of a clock-signal extraction circuit and a demodulation circuit in a power transmission system according to Embodiment 2 of the present invention.
Figure 12:
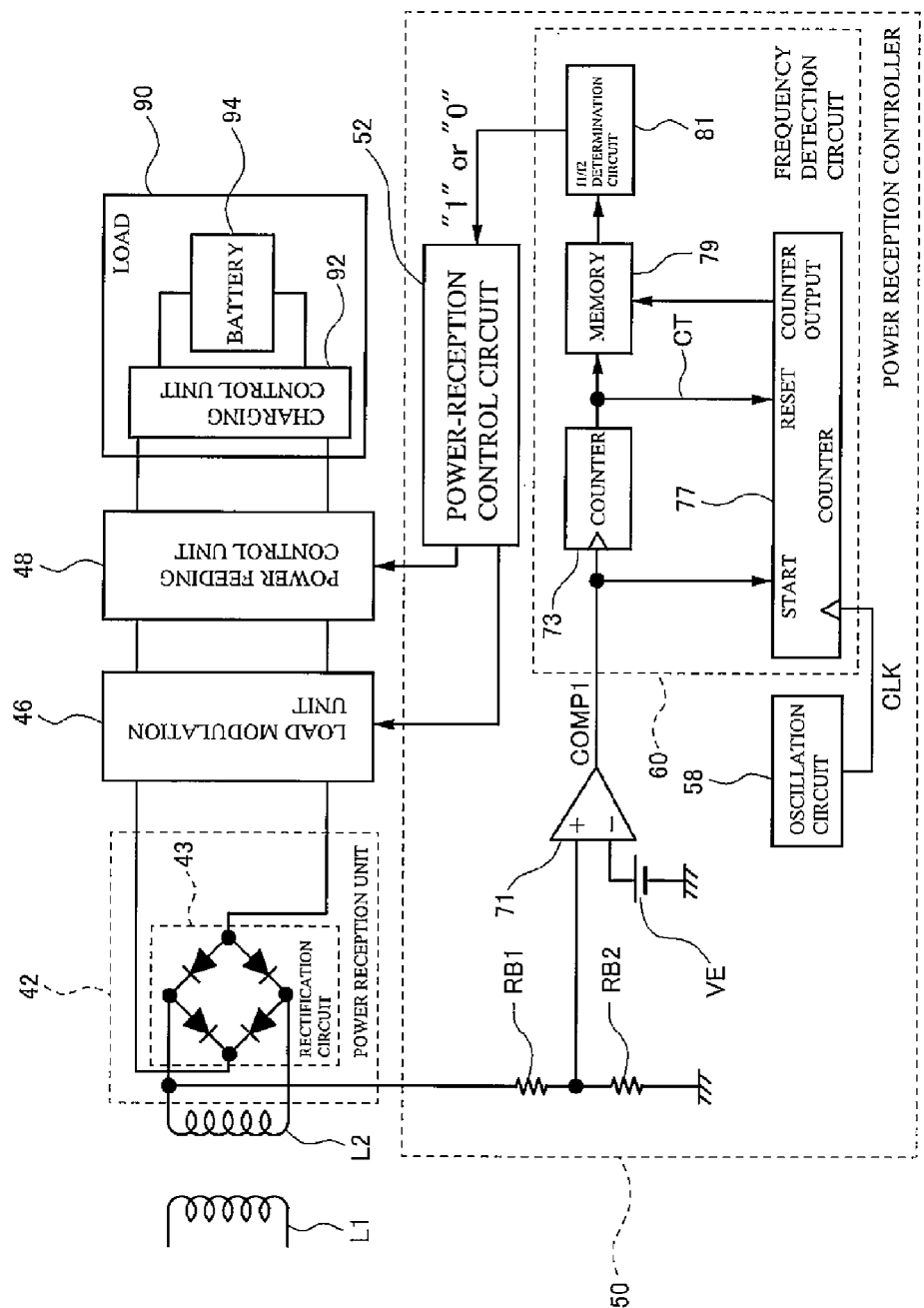
FIG. 12 is a block diagram showing the configuration of a conventional power reception device.

Hereinafter, Embodiment 2 of the present invention will be described. The power transmission system of Embodiment 2 is identical in configuration to the power transmission system of Embodiment 1 of FIG. 1, except for the demodulation circuit 217. FIG. 11 is a block diagram showing the configuration of the clock-signal extraction circuit 216 and the demodulation circuit 217 in the power transmission system according to Embodiment 2 of the present invention. The demodulation circuit 217 of FIG. 11 is different from the demodulation circuit 217 of FIG. 8 in that the clock signal used in the power-reception control circuit 218 is not the output (clock signal CLK1 at the power reception side) of the clock-signal extraction circuit 216 but is the output (clock signal CLK2) of the pulse generating circuit 217*a*.

A power reception device and a power transmission system of the present invention are useful as a power reception device and a power transmission system in which a high accuracy is required when data transmitted from a power transmission side is detected in a power reception side.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A power reception device comprising:
    a secondary coil for receiving AC power corresponding to a clock signal which is frequency-modulated according to a binary data signal, the AC power being transmitted from a power transmission device;
    a clock-signal extraction circuit configured to extract the clock signal from an induced voltage induced at one end of the secondary coil in receiving the AC power and output the extracted clock signal; and
    a demodulation circuit configured to generate a pulse synchronously with the extracted clock signal, and demodulate the pulse to obtain the binary data signal,
    wherein the clock-signal extraction circuit is applied with the induced voltage as an input, limits the induced voltage between an upper limit and a lower limit and outputs the limited induced voltage as the extracted clock signal, the induced voltage exceeding the upper limit and falling below the lower limit.

2. The power reception device according to claim 1, wherein the demodulation circuit includes:
    a pulse generating circuit configured to output a pulse having a constant pulse width corresponding to every edge of the extracted clock signal;
    an integration circuit configured to integrate the pulse output from the pulse generating circuit;
    a binarization circuit configured to binarize a signal output from the integration circuit and output the binarized signal; and
    a binary data detection circuit configured to convert the binarized signal output from the binarization circuit into a binary data signal corresponding to the binarized signal.

3. The power reception device according to claim 2, wherein when the binary data signal used for modulating the clock signal is defined as "1," an AC voltage of n (n: integer of 2 or more) cycles of a first frequency is induced by the secondary coil,
    when the binary data signal used for modulating the clock signal is defined as "0," an AC voltage of the n cycles of a second frequency is induced by the secondary coil,
    the integration circuit outputs a first voltage corresponding to the first frequency or a second voltage corresponding to the second frequency, and
    the binary data detection circuit detects whether each of the first voltage and the second voltage is either "0" or "1," based on a result of counting a duration period of the first voltage or a duration period of the second voltage based on the extracted clock signal.

4. The power reception device according to claim 3, wherein the binary data detection circuit detects whether each of the first voltage and the second voltage is either "0" or "1," when a counted value exceeds m (m: integer equal to or less than n), the counted value being the duration period of the first voltage or the duration period of the second voltage counted based on the extracted clock signal.

5. The power reception device according to claim 3, wherein the binary data detection circuit detects whether each of the first voltage and the second voltage is either "0" or "1," when a counted value exceeds m (m=n/2), the counted value being the duration period of the first voltage or the duration period of the second voltage counted based on the extracted clock signal.

6. The power reception device according to claim 1, wherein when a frequency of the clock signal modulated in the power transmission device is a first frequency, a clock frequency in the power reception device is the first frequency of the extracted clock signal; and
    when the frequency of the clock signal modulated in the power transmission device is a second frequency, the clock frequency in the power reception device is the second frequency of the extracted clock signal.

7. The power reception device according to claim 6, wherein each of the first frequency and the second frequency of the clock signal modulated in the power transmission device is a frequency of the clock signal at a power transmission side in the power transmission device.

8. The power reception device according to claim 1, wherein an upper portion exceeding the upper limit and a lower portion falling below the lower limit of the induced voltage are cut by the clock-signal extraction circuit.

9. A power transmission system including:
a power transmission device including a primary coil; and
a power reception device including a secondary coil, wherein:
the power transmission device is configured to drive the primary coil and transmit AC power corresponding to a clock signal which is frequency-modulated by a binary data signal,
the primary coil and the secondary coil are electromagnetically coupled together to receive by the secondary coil in the power reception device, thereby the AC power is transmitted from the power transmission device to the power reception device,
the power reception device comprises:
a clock-signal extraction circuit configured to extract the clock signal from an induced voltage induced at one end of the secondary coil in receiving the AC power and output the extracted clock signal; and
a demodulation circuit configured to generate a pulse synchronously with the extracted clock signal, and demodulate the pulse to obtain the binary data signal, and
the clock-signal extraction circuit is applied with the induced voltage as an input, limits the induced voltage between an upper limit and a lower limit and outputs the limited induced voltage as the extracted clock signal, the induced voltage exceeding the upper limit and falling below the lower limit.

10. The power transmission system according to claim 9, wherein the demodulation circuit includes:
a pulse generating circuit configured to output a pulse having a constant pulse width corresponding to every edge of the extracted clock signal;
an integration circuit configured to integrate the pulse output from the pulse generating circuit;
a binarization circuit configured to binarize a signal output from the integration circuit and output the binarized signal; and
a binary data detection circuit configured to convert the binarized signal output from the binarization circuit into a binary data signal corresponding to the binarized signal.

11. The power transmission system according to claim 9, wherein:
the power transmission device further includes:
a binary data signal output circuit configured to output a binary data signal defining "0" or "1";
a modulation circuit configured to generate the clock signal which is an AC voltage having a first frequency or a second frequency based on the binary data signal which is output from the binary data signal output circuit;
a power-transmission control circuit configured to generate a drive signal based on the clock signal output from the clock signal generating circuit; and
a power transmission unit configured to drive the primary coil based on the drive signal output from the power-transmission control circuit and transmit AC power corresponding to the drive signal, and the modulation circuit includes:
a voltage generating circuit configured to generate a first voltage or a second voltage according to whether the binary data signal output from the binary data signal output circuit is "0" or "1"; and
a voltage controlled oscillation circuit configured to generate the clock signal having the first frequency or the second frequency based on the first voltage or the second voltage generated in the voltage generating circuit.

12. The power transmission system according to claim 9, wherein an upper portion exceeding the upper limit and a lower portion falling below the lower limit of the induced voltage are cut by the clock-signal extraction circuit.

* * * * *